(12) United States Patent
Han

(10) Patent No.: US 11,842,020 B2
(45) Date of Patent: Dec. 12, 2023

(54) TOUCH SENSING APPARATUS

(71) Applicant: LX Semicon Co., Ltd., Daejeon (KR)

(72) Inventor: Chan Hee Han, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/969,412

(22) Filed: Oct. 19, 2022

(65) Prior Publication Data

US 2023/0176704 A1    Jun. 8, 2023

(30) Foreign Application Priority Data

Dec. 7, 2021 (KR) .................. 10-2021-0173345

(51) Int. Cl.
*G06F 3/041* (2006.01)
*G06F 3/044* (2006.01)

(52) U.S. Cl.
CPC ........ *G06F 3/0446* (2019.05); *G06F 3/04164* (2019.05); *G06F 3/04166* (2019.05)

(58) Field of Classification Search
None
See application file for complete search history.

(56) References Cited

U.S. PATENT DOCUMENTS

| | | | |
|---|---|---|---|
| 2013/0147724 A1* | 6/2013 | Hwang | G06F 3/0412 345/173 |
| 2014/0184559 A1* | 7/2014 | Han | G06F 3/0412 345/174 |
| 2018/0129329 A1* | 5/2018 | Liu | G06F 3/0412 |
| 2022/0206614 A1* | 6/2022 | Lee | G09G 3/2092 |

FOREIGN PATENT DOCUMENTS

| | | |
|---|---|---|
| JP | 5888951 B2 | 3/2016 |
| KR | 20090104192 A | 10/2009 |
| KR | 102025283 B1 | 9/2019 |

* cited by examiner

*Primary Examiner* — Krishna P Neupane
(74) *Attorney, Agent, or Firm* — ROTHWELL, FIGG, ERNST & MANBECK, P.C.

(57) ABSTRACT

The present disclosure relates to a technology to sense a touch panel on which vertical pattern electrodes and horizontal pattern electrodes are disposed and provides a technology to identify touch coordinates based on sensing values of the vertical pattern electrodes and the horizontal pattern electrodes.

20 Claims, 11 Drawing Sheets

TOUCH SENSING APPARATUS

CROSS REFERENCE TO RELATED APPLICATION

This application claims priority to Republic of Korea Patent Application No. 10-2021-0173345 filed on Dec. 7, 2021, which is hereby incorporated by reference in its entirety.

BACKGROUND

1. Field of Technology

The present disclosure relates to a touch sensing apparatus, which senses a touch by an electrode disposed on a touch panel.

2. Related Technology

Recently, from a small electronic device (e.g., smartphone) to a large electronic device (e.g., TV or electronic blackboard), a touch function is widely used on a display panel. In this case, a display panel is mostly implemented as a flat display device such as a liquid crystal display, and the touch function is implemented by a touch panel combined with the display panel.

The touch panel means a transparent switch panel having a function of operating a device or executing a program as a user presses a text, an image, or an icon. The touch panel may be configured to perform touch recognition electrostatically, and as an example of a touch panel implementing the electrostatic touch recognition, "Mutual capacitance touch sensing device" is disclosed in US Patent Application Publication No. US 2009/0091551. A general touch pattern has a configuration independent of the display panel, and is separately manufactured, and then is combined with the display panel.

On the touch panel, touch electrodes (TEs) (or electrodes (ELs)) having a predetermined size may be disposed in accordance with a specific arrangement method (or specific pattern). For example, touch electrodes having a predetermined size may be disposed in the form of an N*M matrix in accordance with the size of the display device or the size of the touch panel. If a specific object (e.g., hand or electronic pen) comes in contact with the plurality of touch electrodes disposed on the touch panel, the respective touch electrodes can sense the touch of the object. A touch sensing device can determine the position (or touch coordinates) where the object is touched through the position of the touch electrode where the contact of the object is sensed.

A touch electrode arrangement method (or touch electrode pattern) disposed on the touch panel can be implemented in various forms, and the touch electrodes having the same size may be typically disposed in the form of a matrix. Meanwhile, if the touch electrode arrangement method (or touch electrode pattern) disposed on the touch panel is changed, an algorithm for determining the touch position (or touch coordinates) may be changed. Accordingly, in case of applying the existing touch pattern processing method to the changed touch electrode pattern, a problem in that an inaccurate result is output may occur.

The discussions in this section are only to provide background information and does not constitute an admission of prior art.

SUMMARY

Under such a background, in one aspect, various embodiments are directed to providing a touch sensing apparatus, which can determine accurate coordinates such as a pattern of an existing touch electrode even if the pattern of the touch electrode is changed.

In one aspect, the present disclosure provides a touch sensing apparatus comprising: a touch driving circuit to supply driving signals to a first vertical pattern electrode comprising a plurality of vertical sub-pattern electrodes and a first horizontal pattern electrode and a second horizontal pattern electrode adjacent to one vertical sub-pattern electrode among the plurality of vertical sub-pattern electrodes; and a data processing circuit to determine data corresponding to the one vertical sub-pattern electrode for identifying touch coordinates based on a sensing value sensed by the first vertical pattern electrode, a sensing value sensed by the first horizontal pattern electrode and a sensing value sensed by the second horizontal pattern electrode.

In another aspect, the present disclosure provides a touch sensing apparatus comprising: a touch driving circuit to supply driving signals to a plurality of vertical pattern electrodes and a plurality of horizontal pattern electrodes; and a data processing circuit to identify touch coordinates based on sensing values sensed by the plurality of vertical pattern electrodes and the plurality of horizontal pattern electrodes, wherein the data processing circuit determines data corresponding to each of a plurality of vertical sub-pattern electrodes, with respect to each of the plurality of vertical pattern electrodes, based on a sensing value sensed by each of the vertical pattern electrodes and a sensing value sensed by at least one of the horizontal pattern electrodes adjacent to each of the plurality of vertical sub-pattern electrodes, determines data corresponding to a plurality of horizontal sub-patterns, with respect to each of the plurality of horizontal pattern electrodes, based on a sensing value sensed by each of the horizontal pattern electrodes and the data corresponding to the at least one of the vertical sub-patterns adjacent to each of the plurality of horizontal sub-patterns, and identifies the touch coordinates based on the determined data corresponding to each of the plurality of vertical sub-pattern electrodes and the data corresponding to each of the plurality of horizontal sub-pattern electrodes.

In still another aspect, the present disclosure provides a touch sensing apparatus comprising: a touch driving circuit to supply driving signals to a plurality of first-direction electrodes and a plurality of second-direction electrodes, which disposed to be perpendicular to the first-direction electrodes; and a data processing circuit to identify touch coordinates based on sensing values sensed by the plurality of first-direction electrodes and the plurality of second-direction electrodes, wherein the data processing circuit determines data corresponding to a plurality of first-direction sub-pattern electrodes, corresponding to each of the plurality of first-direction electrodes, based on the sensing values sensed by the plurality of second-direction electrodes, determines data corresponding to a plurality of second-direction sub-pattern electrodes, corresponding to each of the plurality of second-direction electrodes, based on the determined data corresponding to the plurality of first-direction sub-pattern electrodes corresponding to each first-direction electrode, and identifies the touch coordinates based on the data corresponding to the plurality of first-direction sub-pattern electrodes and the data corresponding to the plurality of second-direction sub-pattern electrodes.

As is apparent from the above, according to the embodiments, it is possible to determine accurate coordinates such as a pattern of an existing touch electrode through a data conversion process even if the pattern of the touch electrode is changed.

According to the embodiments, it is possible to obtain sensing data of a matrix pattern from sensing values sensed with respect to a plurality of vertical pattern electrodes and a plurality of horizontal pattern electrodes.

According to the embodiments, it is possible to determine more precise and accurate touch coordinates by generating a larger amount of data although a relatively smaller number of touch electrodes are disposed in a region having the same area with prior arts. For example, in the panel according to the present disclosure, the number of channels for driving touch electrodes may be reduced to ½. When the number of channels is reduced, the size of an integrated circuit to drive touch electrodes may be reduced and this leads to a reduction of costs required for manufacturing the integrated circuit.

DETAILED DESCRIPTION OF EMBODIMENTS

Figure 1:
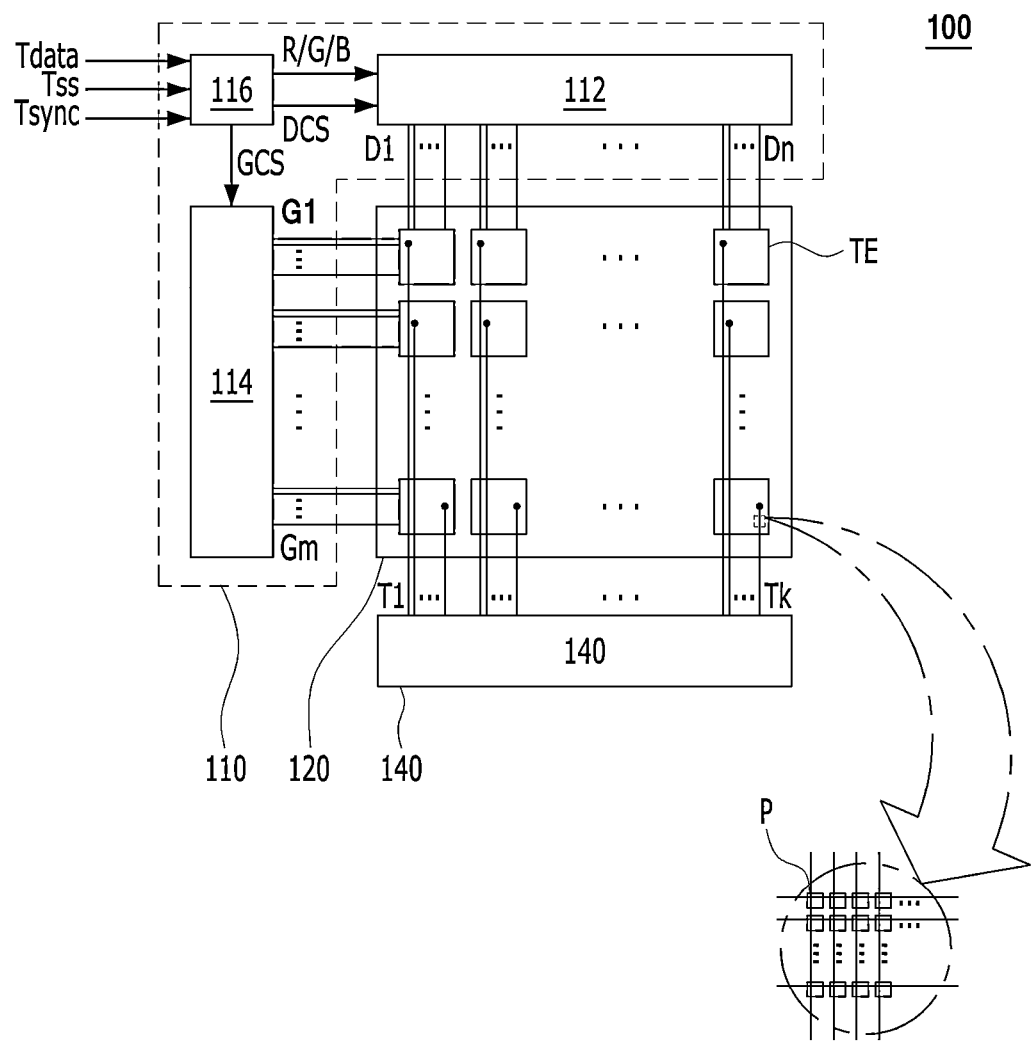
FIG. 1 is a configuration diagram of a display device including a touch sensing apparatus according to an embodiment.

FIG. 1 is a configuration diagram of a display device including a touch sensing apparatus according to an embodiment. As illustrated in FIG. 1, a display device 100 according to an embodiment of the present disclosure may perform a display function and a touch sensing function, and may be implemented as a flat display, such as a liquid crystal display (LCD) or an organic light emitting diode (OLED) display. Although embodiments to be described later exemplify an LCD, the present disclosure is not limited thereto, and may be applied to an LED or OLED based display in the same or similar manner.

According to an embodiment, the display device 100 according to the present disclosure may include a capacitance type touch screen integrally implemented therein in order to sense a touch due to a contact of a conductive material, such as a finger or an active pen. Such a touch screen may be configured in the form independent of a display panel for display implementation, or may be built in a pixel array of the display panel.

As illustrated in FIG. 1, the display device 100 according to an embodiment of the present disclosure includes a panel driving device 110, a panel 120 (e.g., display panel or touch panel), and a touch sensing circuit 140 (or touch sensing circuitry).

The panel 120 displays an image of a predetermined gradation, or receives an input of a touch by a hand (or fingerprint) or an active pen (or electronic pen). The panel 120 may be a display panel having an in-cell touch type structure using a capacitance method. In an embodiment, the panel 120 may be an in-cell touch type display panel using a self-capacitance method, or an in-cell touch type display panel using a mutual capacitance method. Hereinafter, for convenience in explanation, explanation will be made under the assumption that the panel 120 is an in-cell touch type display panel using a self-capacitance method.

The panel 120 may operate in a display mode and a touch sensing mode. During the display mode, the panel 120 displays an image using light irradiated from a backlight unit, and during the touch sensing mode, the panel 120 performs a role of a touch panel for touch sensing.

The panel driving device 110 may include a data driving circuit 112 (for example, a source driver), a gate driving circuit 114 (for example, a gate driver), and a timing controller 116 (for example, a T-CON). The data driving circuit 112, the gate driving circuit 114, and the touch sensing circuit 140 may drive at least one configuration included in the panel 120.

The data driving circuit 112 may drive a data line DL (e.g., D1 to Dn) connected to a pixel P, and the gate driving circuit 114 may drive a gate line GL (e.g., G1 to Gm) connected to the pixel P. Further, the touch sensing circuit 140 may drive an electrode EL or a touch electrode TE disposed on the panel 120.

The data driving circuit 112 may supply a data voltage to the data line DL in order to display an image on each pixel P of the panel 120. The data driving circuit 112 may include at least one data driver integrated circuit, and such at least one data driver integrated circuit may be connected to a bonding pad of the panel 120 in a tape automated bonding (TAB) method or a chip on glass (COG) method, or may be directly formed on the panel 120, and depending on the case, may be formed to be integrated into the panel 120. Further, the data driving circuit 112 may be implemented in a chip on film (COF) method.

The gate driving circuit 114 may supply a scan signal to the gate line GL in order to turn on/off a transistor located on the pixel P. Depending on the driving method, the gate driving circuit 114 may be located on only one side of the panel 120 as in FIG. 1, or may be divided into two and located on both sides of the panel 120. Further, the gate driving circuit 114 may include at least one gate driver integrated circuit, and such at least one gate driver integrated circuit may be connected to the bonding pad of the panel 120 in the tape automated bonding (TAB) method or the chip on glass (COG) method, or may be implemented in a gate in panel (GIP) type and may be directly formed on the panel 120, and depending on the case, may be formed to be integrated into the panel 120. Further, the gate driving circuit 114 may be implemented in the chip on film (COF) method.

The panel 120 may include only a touch panel (touch screen panel (TSP)), or may further include a display panel. Here, the touch panel and the display panel may share some constituent elements with each other. For example, a touch electrode (TE) for sensing a touch on the touch panel may be used as a common voltage electrode to which a common voltage is supplied on the display panel. From the viewpoint that some constituent elements of the display panel and the touch panel are shared, such a panel 120 may be called an integrated panel, but the present disclosure is not limited thereto. Further, although an in-cell type panel is well known as a form in which the display panel and the touch panel are integrally combined, this is merely an example of the above-described panel 120, and the panel to which the present disclosure is applied is not limited to such an in-cell type panel.

Meanwhile, a plurality of touch electrodes TE may be disposed on the panel 120, and the touch sensing circuit 140 may drive the touch electrode TE using a driving signal. Further, the touch sensing circuit 140 may generate a sensing value for the touch electrode TE in accordance with a reaction signal being formed on the touch electrode TE corresponding to the driving signal. Further, the touch sensing circuit 140 may calculate the touch coordinates using the sensing values for the plurality of touch electrodes TE disposed on the panel 120, and the calculated touch coordinates may be transmitted to another device (e.g., host or controller or processor) to be utilized.

Figure 2:
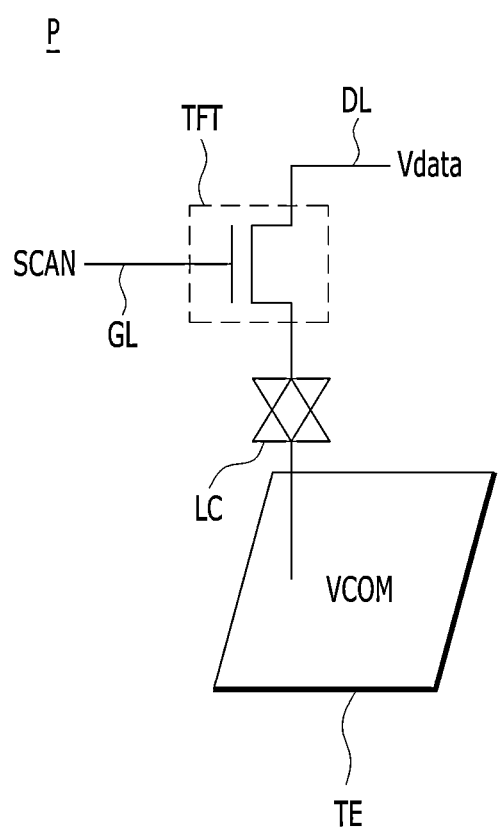
FIG. 2 is an internal configuration diagram of a pixel in case that a touch electrode is used as a common voltage electrode according to an embodiment.

FIG. 2 is an internal configuration diagram of a pixel in case that a touch electrode is used as a common voltage electrode according to an embodiment. Referring to FIG. 2, a transistor (e.g., TFT), a liquid crystal LC, and a common voltage electrode VCOM may be included in a pixel P. The gate terminal of the transistor TFT may be connected to the gate line GL, the drain terminal thereof may be connected to the data line DL, and the source terminal thereof may be connected to the liquid crystal LC.

If a scan signal SCAN corresponding to a turn-on voltage is supplied to the gate terminal through the gate line GL, the drain terminal and the source terminal of the transistor TFT are conducting, and thus a data voltage Vdata can be supplied to the liquid crystal LC. A common voltage may be supplied to the common voltage electrode VCOM, and depending on the difference between the common voltage and the data voltage Vdata, the liquid crystal LC is controlled to adjust brightness of the pixel P.

Meanwhile, the common voltage electrode VCOM may be the same electrode as the touch electrode TE being driven by the touch sensing circuit (refer to 140 of FIG. 1) described above with reference to FIG. 1, but this is merely exemplary, and embodiments of the present disclosure are not limited thereto.

Figure 3:
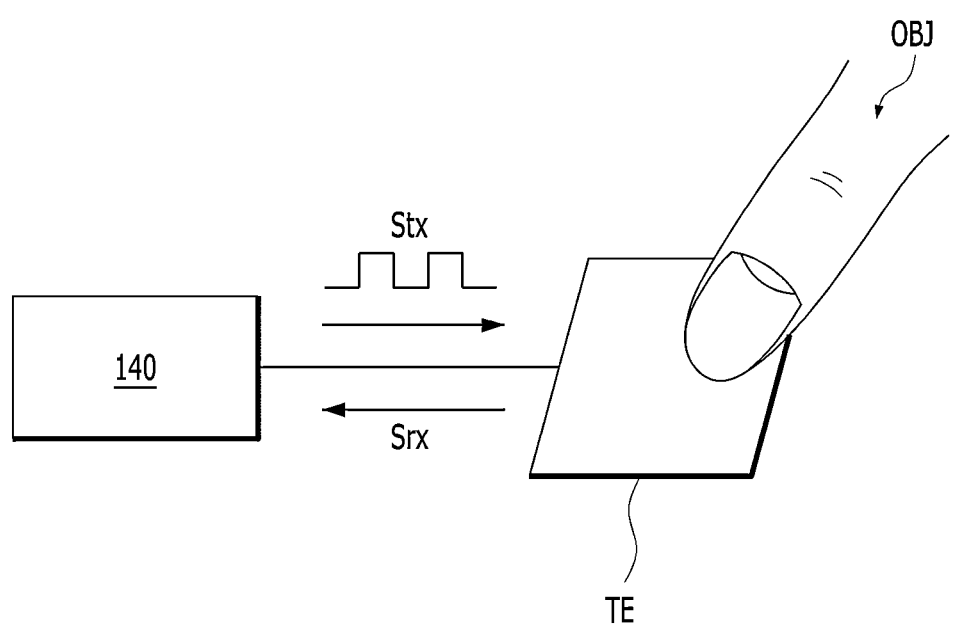
FIG. 3 is a diagram explaining that a touch sensing circuit drives a touch electrode according to an embodiment.

FIG. 3 is a diagram explaining that a touch sensing circuit drives a touch electrode according to an embodiment. Referring to FIG. 3, the touch sensing circuit 140 may drive the touch electrode TE using a driving signal Stx, and may sense a touch or proximity of an external object OBJ against the panel in accordance with a reaction signal Srx being formed on the touch electrode TE corresponding to the driving signal Stx.

In this case, the touch sensing circuit 140 may adopt a capacitance touch method for recognizing the proximity or touch of the object OBJ through sensing of the capacitance or capacitance change of the touch electrode TE.

Such a capacitance touch method may be divided into a mutual capacitance touch method and a self-capacitance touch method as an example. The mutual capacitance touch method, which is one kind of capacitance touch method, applies a touch driving signal Stx to one touch electrode, and senses the other touch electrode that is mutually coupled to the one touch electrode. In such a mutual capacitance touch method, a value being sensed on the other touch electrode differs depending on the touch or proximity of the object OBJ, such as a finger or a pen, and the mutual capacitance touch method detects the touch existence/nonexistence, touch coordinates, and the like using such a sensing value.

The self-capacitance touch method, which is the other kind of capacitance touch method, applies a touch driving signal Stx to one touch electrode, and then senses the corresponding one touch electrode again. In such a self-capacitance touch method, a value being sensed on the corresponding one touch electrode differs depending on the touch or proximity of the object OBJ, such as the finger or the pen, and the self-capacitance touch method detects the touch existence/nonexistence, touch coordinates, and the like using such a sensing value. In such a self-capacitance touch method, the touch electrode for applying the touch driving signal Stx and the touch electrode for sensing are the same.

An embodiment may be applied to the mutual capacitance touch method, and may be applied to the self-capacitance touch method. In some examples below, for convenience in explanation, a case that an embodiment is applied to the self-capacitance touch method will be described.

Figure 4:
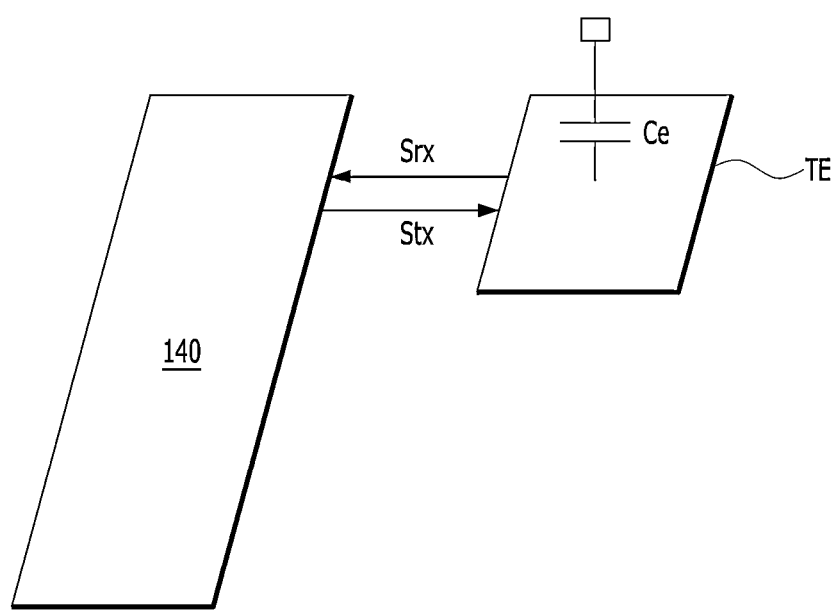
FIG. 4 is an exemplary diagram explaining a base capacitance according to an embodiment.

FIG. 4 is an exemplary diagram explaining a base capacitance according to an embodiment. Referring to FIG. 4, if there is not a touch or proximity of an external object, a base capacitance Ce may be formed in the touch electrode TE. Meanwhile, the touch sensing circuit 140 may supply the driving signal Stx to the touch electrode TE, and may receive the reaction signal Srx from the touch electrode TE. Further, the touch sensing circuit 140 may identify the sensing value corresponding to the capacitance of the touch electrode TE using the reaction signal Srx, and if the sensing value is different from the base sensing value corresponding to the base capacitance Ce, the touch sensing circuit 140 may recognize that an external object comes close to or touches the touch electrode TE.

Figure 5:
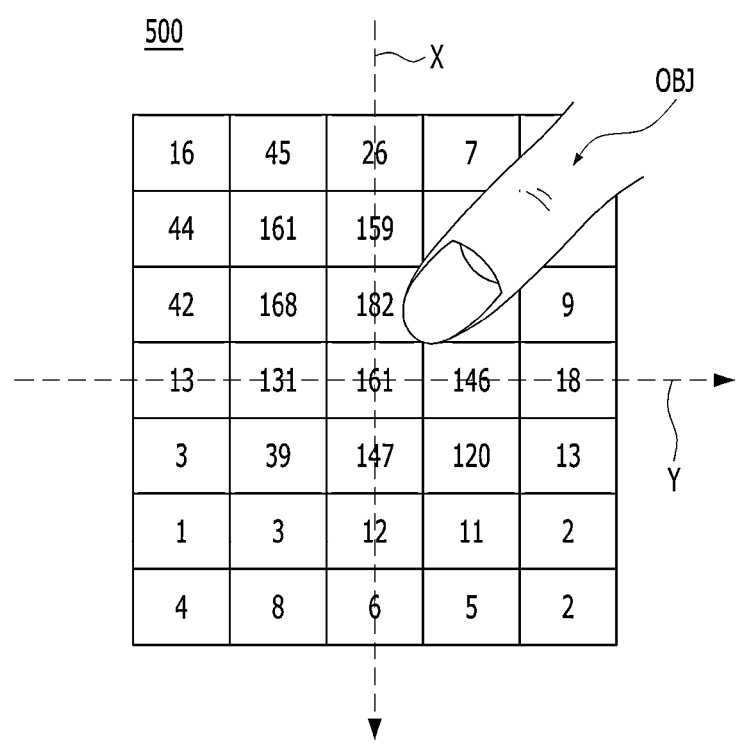
FIG. 5 is an exemplary diagram explaining data corresponding to a touch electrode according to an embodiment.

FIG. 5 is an exemplary diagram explaining data corresponding to a touch electrode according to an embodiment. A touch image illustrated in FIG. 5 may mean a table in which sensing values are represented corresponding to locations of the touch electrodes. Referring to the touch image illustrated in FIG. 5, in accordance with the touch of the external object OBJ, the sensing value of the third touch electrode on line X is represented as 182 that is the maximum value, and it can be known that as the external object gets further away from the corresponding touch electrode, the sensing value becomes smaller. The sensing values on line X of FIG. 5 may represent a continuous curve shape, and the touch sensing circuit 140 may calculate the touch coordinates by inputting various sensing values being identified along a predetermined line to a specific model or algorithm. For example, the touch sensing circuit 140 may calculate the first touch coordinate T1 in an X-line direction by substituting three or more sensing values being identified along line X for a predetermined function, for example, Gaussian curve. In the same manner, the second touch coordinate in a Y-line direction may be calculated. The touch coordinates on the plane may be calculated through calculation of the touch coordinates in the two orthogonal directions.

Hereinafter, with reference to FIGS. 6 to 12, a data conversion method between touch patterns according to an embodiment will be described.

Figure 6:
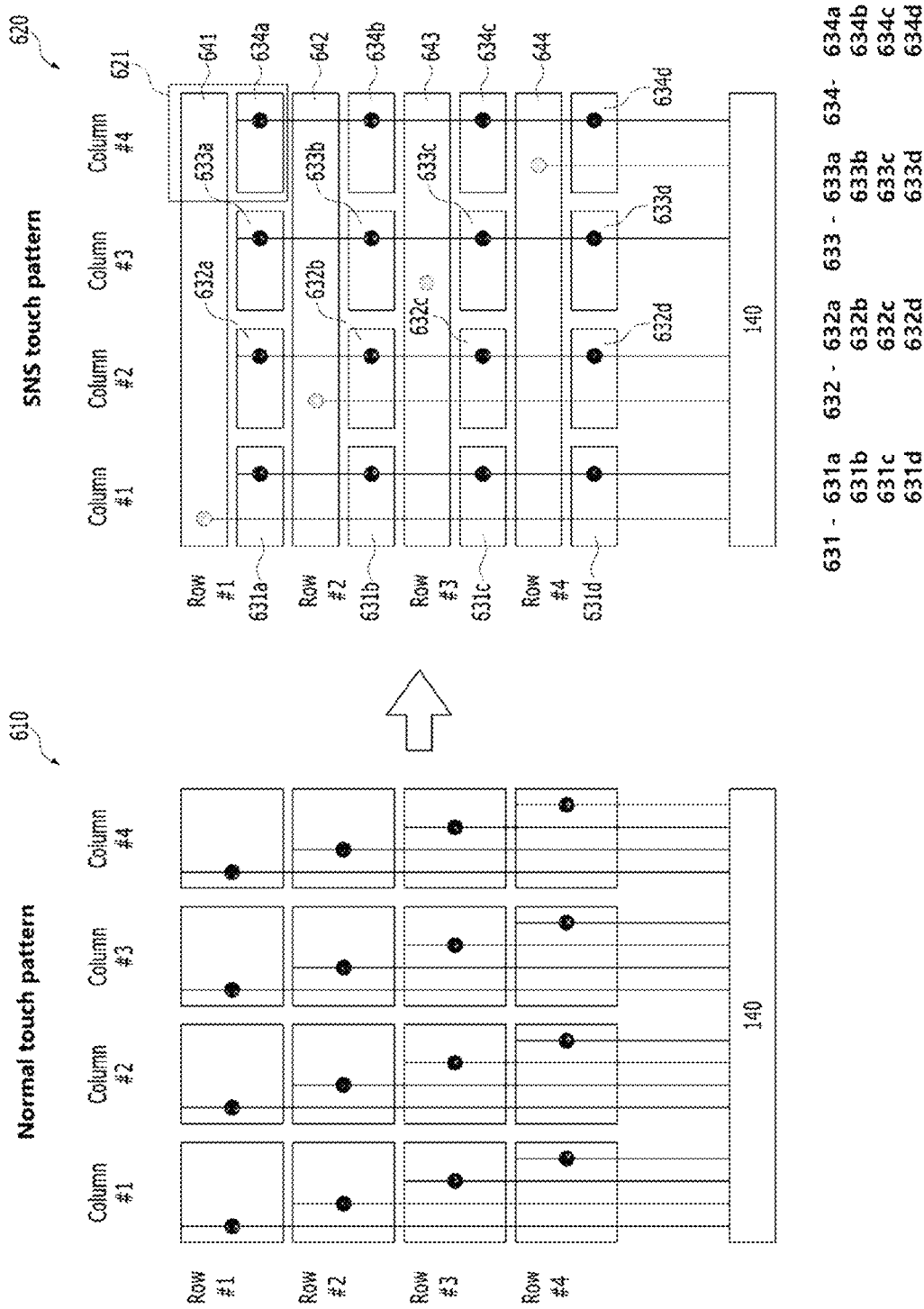
FIG. 6 is a diagram explaining comparison between touch patterns according to an embodiment.

FIG. 6 is a diagram explaining comparison between touch patterns according to an embodiment. Referring to FIG. 6, the touch electrodes TE disposed on the panel 120 may be arranged in the form of a matrix as illustrated on the left side of FIGS. 1 and 6. Hereinafter, for convenience in explanation, the arrangement in the form of a matrix is referred to as a normal touch pattern 610.

On the normal touch pattern 610, the touch electrodes TE may be disposed with a predetermined size and at predetermined intervals depending on rows and columns. For example, in case of arranging the touch electrodes TE in four rows and four columns as the normal touch pattern 610, total 16 touch electrodes TE may be disposed. On the normal touch pattern 610, the touch electrodes TE having the 4*4 arrangement, for convenience, may be referred to as one unit array, but are not limited thereto. The touch electrodes TE matching the corresponding size may be disposed by repeatedly forming the unit arrays on a horizontal axis and/or a vertical axis depending on the size of the display device or the size of the touch panel. In the following description, for convenience, explanation will be made based on one unit array.

On the normal touch pattern 610, sensing values sensed by the respective touch electrode TE may be input to the touch sensing circuit 140. For example, the touch sensing circuit 140 may acquire 16 sensing values from 16 touch electrodes TE included in the unit array. The touch sensing circuit 140 may determine the position touched by the object or whether to touch based on the sensing values for the respective touch electrodes TE.

Referring again to FIG. 6, the touch electrodes TE disposed on the panel 120 may be arranged in the form in which a plurality of vertical pattern electrodes 631, 632, 633, and 634 and a plurality of horizontal pattern electrodes 641, 642, 643, and 644 cross each other as illustrated on the right side of FIG. 6. Hereinafter, for convenience in explanation, the above-described arrangement form of the pattern is referred to as a self in self (SNS) touch pattern 620, but the present disclosure is not limited to the term. On the SNS touch pattern 620, the touch electrodes TE may be disposed so that the plurality of vertical pattern electrodes and the plurality of horizontal pattern electrodes cross each other depending on the respective rows and columns. For example, in case of disposing the touch electrodes TE in four rows and four columns as the SNS touch pattern 620, total 8 touch electrodes TE may be disposed. On the SNS touch pattern 620, for convenience, the touch electrodes TE disposed in four rows and four columns may be referred to as one unit array, but are not limited thereto. The touch electrodes TE matching the corresponding size may be disposed by repeatedly forming the unit arrays on the horizontal axis and/or the vertical axis depending on the size of the display device or the size of the touch panel. In the following description, for convenience, explanation will be made based on one unit array.

For example, as illustrated on the right side of FIG. 6, on the SNS touch pattern 620, the first vertical pattern electrode 631 may be disposed in a first column (Column #1), the second vertical pattern electrode 632 may be disposed in a second column (Column #2), the third vertical pattern electrode 633 may be disposed in a third column (Column #3), and the fourth vertical pattern electrode 634 may be disposed in a fourth column (Column #4). Each of the vertical pattern electrodes 631, 632, 633, and 634 may include a plurality of vertical sub-pattern electrodes.

For example, the first vertical pattern electrode 631 disposed in the first column may include the (1-1)-th vertical sub-pattern electrode 631a, the (1-2)-th vertical sub-pattern electrode 631b, the (1-3)-th vertical sub-pattern electrode 631c, and the (1-4)-th vertical sub-pattern electrode 631d by rows. The respective vertical sub-patterns 631a, 631b, 631c, and 631d of the first vertical pattern electrode 631 may be disposed to be physically divided by rows. Further, although the respective vertical sub-patterns 631a, 631b, 631c, and 631d of the first vertical pattern electrode 631 may be disposed to be physically divided, they may be electrically connected to one as illustrated in FIG. 6. For example, the respective vertical sub-patterns 631a, 631b, 631c, and 631d of the first vertical pattern electrode 631 may be connected by one common line from the touch sensing circuit 140.

Further, the second vertical pattern electrode 632 disposed in the second column may include the (2-1)-th vertical sub-pattern electrode 632a, the (2-2)-th vertical sub-pattern electrode 632b, the (2-3)-th vertical sub-pattern electrode 632c, and the (2-4)-th vertical sub-pattern electrode 632d by rows. The respective vertical sub-patterns 632a, 632b, 632c, and 632d of the second vertical pattern electrode 632 may be disposed to be physically divided by rows. Further, although the respective vertical sub-patterns 632a, 632b, 632c, and 632d of the second vertical pattern electrode 632 may be disposed to be physically divided, they may be electrically connected to one as illustrated in FIG. 6. For example, the respective vertical sub-patterns 632a, 632b, 632c, and 632d of the second vertical pattern electrode 632 may be connected by one common line from the touch sensing circuit 140.

Further, the third vertical pattern electrode 633 disposed in the third column may include the (3-1)-th vertical sub-pattern electrode 633a, the (3-2)-th vertical sub-pattern electrode 633b, the (3-3)-th vertical sub-pattern electrode 633c, and the (3-4)-th vertical sub-pattern electrode 633d by rows. The respective vertical sub-patterns 633a, 633b, 633c, and 633d of the third vertical pattern electrode 633 may be disposed to be physically divided by rows. Further, although the respective vertical sub-patterns 633a, 633b, 633c, and 633d of the third vertical pattern electrode 633 may be disposed to be physically divided, they may be electrically connected to one as illustrated in FIG. 6. For example, the respective vertical sub-patterns 633a, 633b, 633c, and 633d of the third vertical pattern electrode 633 may be connected by one common line from the touch sensing circuit 140.

Further, the fourth vertical pattern electrode 634 disposed in the fourth column may include the (4-1)-th vertical sub-pattern electrode 634a, the (4-2)-th vertical sub-pattern electrode 634b, the (4-3)-th vertical sub-pattern electrode 634c, and the (4-4)-th vertical sub-pattern electrode 634d by rows. The respective vertical sub-patterns 634a, 634b, 634c, and 634d of the fourth vertical pattern electrode 634 may be disposed to be physically divided by rows. Further, although the respective vertical sub-patterns 634a, 634b, 634c, and 634d of the fourth vertical pattern electrode 634 may be disposed to be physically divided, they may be electrically connected to one as illustrated in FIG. 6. For example, the respective vertical sub-patterns 634a, 634b, 634c, and 634d of the fourth vertical pattern electrode 634 may be connected by one common line from the touch sensing circuit 140.

According to an embodiment, on the SNS touch pattern 620, the first horizontal pattern electrode 641 may be disposed in a first row (Row #1), the second horizontal pattern electrode 642 may be disposed in a second row (Row #2), the third horizontal pattern electrode 643 may be disposed in a third row (Row #3), and the fourth horizontal pattern electrode 644 may be disposed in a fourth row (Row #4). In FIG. 6, the respective horizontal pattern electrodes 641, 642, 643, and 644 are illustrated as one electrode, and may have one physical form, but each of the respective horizontal pattern electrodes 641, 642, 643, and 644 may include a plurality of horizontal sub-pattern electrodes. For example, on the SNS touch pattern 620, a group 621 of one horizontal sub-pattern electrode and one vertical sub-pattern electrode may correspond to each of the touch electrodes on the normal touch pattern 610.

According to an embodiment, the plurality of vertical pattern electrodes may be referred to as first direction electrodes, and the plurality of horizontal pattern electrodes may be referred to as second direction electrodes. The second direction may be vertical to the first direction.

According to an embodiment, in case of comparing the normal touch pattern 610 with the SNS touch pattern 620, the SNS touch pattern 620 may have a reduced number of touch electrodes and reduced sensing values being sensed by the touch electrodes in the same area as compared with the normal touch pattern 610. That is, referring to FIG. 6, with respect to one unit array including four rows and four columns, on the normal touch pattern 610, 16 sensing values from the total 16 touch electrodes may be collected into the touch sensing circuit 140. In contrast, with respect to one unit array including four rows and four columns, on the SNS touch pattern 620, 8 sensing values from the total 8 touch electrodes may be collected into the touch sensing circuit 140. Meanwhile, as in the following description, the SNS touch pattern 620 may include a plurality (e.g., four) of sub-patterns with respect to the plurality of vertical pattern electrodes and the plurality of horizontal pattern electrodes, and data about the sub-patterns may be acquired. Accordingly, with respect to the unit array of the SNS touch pattern 620, 16 (4*4) pieces of data are acquired from 4 horizontal pattern electrodes, and 16 (4*4) pieces of data are acquired from 4 vertical pattern electrodes, so that the total 32 (16+16) pieces of data can be acquired. Accordingly, in case of comparing the normal touch pattern 610 with the SNS touch pattern 620, the SNS touch pattern 620 may have a relatively small number of touch electrodes and relatively small sensing values being sensed by the touch electrodes in the same area as compared with the normal touch pattern 610, but the number of pieces of acquired data may be increased. In an example of FIG. 6, it can be known that the number of pieces of data acquired from one unit array becomes 16 on the normal touch pattern 610, whereas it becomes 32, which is twice 16, on the SNS touch pattern 620.

According to an embodiment, as described above with reference to FIG. 6, the SNS touch pattern 620 may be referred to as the first touch pattern, and the normal touch pattern 610 may be referred to as the second touch pattern. In the following description, a method for acquiring data corresponding to the second touch pattern (e.g., normal touch pattern 610) from the sensing values sensed through the first touch pattern (e.g., SNS touch pattern 620) will be described.

Figure 7:
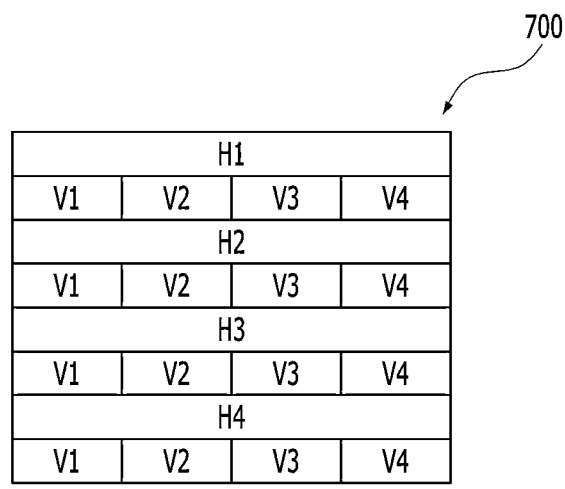
FIG. 7 is a diagram explaining sensed data of touch patterns according to an embodiment.

FIG. 7 is a diagram explaining sensed data of touch patterns according to an embodiment. According to an embodiment, data sensed by one unit array of the first touch pattern (e.g., SNS touch pattern 620) of FIG. 6 may be represented as sensing data 700 as illustrated in FIG. 7.

Referring to FIG. 7, the sensing data 700 sensed from the first touch pattern (e.g., SNS touch pattern 620) of FIG. 6 may be represented as four pieces of vertical pattern data (e.g., V1, V2, V3, and V4) and four pieces of horizontal pattern data (e.g., H1, H2, H3, and H4). As described above, according to an embodiment, each vertical pattern electrode may be divided into four physical areas. In FIG. 7, it can be known that the data sensed by each vertical pattern electrode is represented as four pieces of the same data depending on the divided areas. For example, the four pieces of data sensed by each vertical pattern electrode may be represented to be divided by the horizontal pattern electrode as illustrated in FIG. 7. That is, the first vertical pattern data V1 may be divided into four areas by the second horizontal pattern data H2, the third horizontal pattern data H3, and the fourth horizontal pattern data H4, and the second vertical pattern data V2 may be divided into four areas by the second horizontal pattern data H2, the third horizontal pattern data H3, and the fourth horizontal pattern data H4. The third vertical pattern data V3 may be divided into four areas by the second horizontal pattern data H2, the third horizontal pattern data H3, and the fourth horizontal pattern data H4, and the fourth vertical pattern data V4 may be divided into four areas by the second horizontal pattern data H2, the third horizontal pattern data H3, and the fourth horizontal pattern data H4. According to an embodiment, the first vertical pattern data V1 may be divided by an adjacent array and the first horizontal pattern data H1. According to an embodiment, each vertical pattern data divided into four areas may correspond to vertical sub-pattern data.

Hereinafter, with reference to FIGS. 8 to 10, a method for converting data sensed with respect to the first touch pattern (e.g., SNS touch pattern 620) illustrated in FIG. 7 into data of the second touch pattern (e.g., normal touch pattern 610) will be described in detail.

Figure 8:
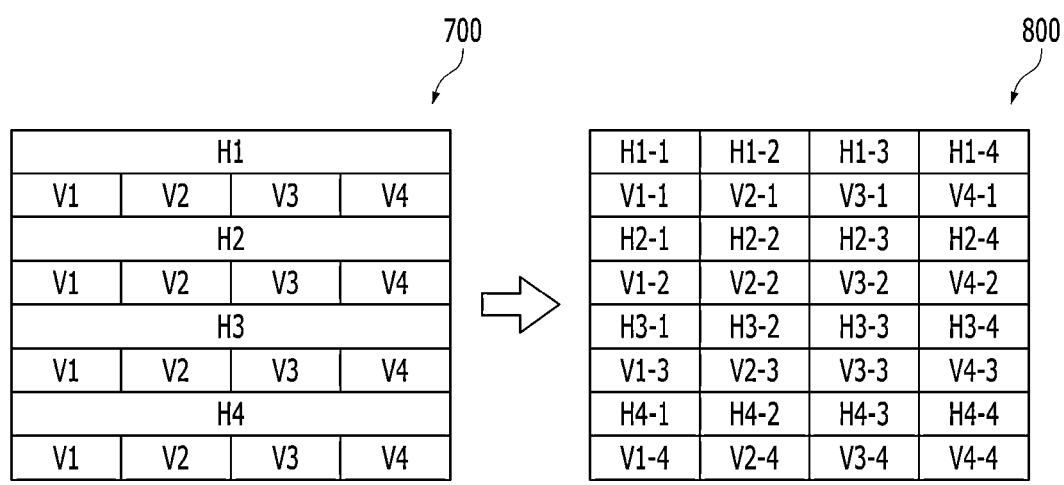
FIG. 8 is a diagram explaining a data conversion relationship between touch patterns according to an embodiment.

FIG. 8 is a diagram explaining a data conversion relationship between touch patterns according to an embodiment. Referring to FIG. 8, sensing data 700 sensed with respect to the first touch pattern (e.g., SNS touch pattern 620) may be converted into data 800 of the second touch pattern (e.g., normal touch pattern 610).

For example, the first vertical pattern data V1 may be converted into the (1-1)-th vertical sub-pattern data V1-1, the (1-2)-th vertical sub-pattern data V1-2, the (1-3)-th vertical sub-pattern data V1-3, and the (1-4)-th vertical sub-pattern data V1-4. The second vertical pattern data V2 may be converted into the (2-1)-th vertical sub-pattern data V2-1, the (2-2)-th vertical sub-pattern data V2-2, the (2-3)-th vertical sub-pattern data V2-3, and the (2-4)-th vertical sub-pattern data V2-4. The third vertical pattern data V3 may be converted into the (3-1)-th vertical sub-pattern data V3-1, the (3-2)-th vertical sub-pattern data V3-2, the (3-3)-th vertical sub-pattern data V3-3, and the (3-4)-th vertical sub-pattern data V3-4. The fourth vertical pattern data V4 may be converted into the (4-1)-th vertical sub-pattern data V4-1, the (4-2)-th vertical sub-pattern data V4-2, the (4-3)-th vertical sub-pattern data V4-3, and the (4-4)-th vertical sub-pattern data V4-4.

Further, the first horizontal pattern data H1 may be converted into the (1-1)-th horizontal sub-pattern data H1-1, the (1-2)-th horizontal sub-pattern data H1-2, the (1-3)-th horizontal sub-pattern data H1-3, and the (1-4)-th horizontal sub-pattern data H1-4. The second horizontal pattern data H2 may be converted into the (2-1)-th horizontal sub-pattern data H2-1, the (2-2)-th horizontal sub-pattern data H2-2, the (2-3)-th horizontal sub-pattern data H2-3, and the (2-4)-th horizontal sub-pattern data H2-4. The third horizontal pattern data H3 may be converted into the (3-1)-th horizontal sub-pattern data H3-1, the (3-2)-th horizontal sub-pattern data H3-2, the (3-3)-th horizontal sub-pattern data H3-3, and the (3-4)-th horizontal sub-pattern data H3-4. The fourth horizontal pattern data H4 may be converted into the (4-1)-th horizontal sub-pattern data H4-1, the (4-2)-th horizontal sub-pattern data H4-2, the (4-3)-th horizontal sub-pattern data H4-3, and the (4-4)-th horizontal sub-pattern data H4-4.

According to an embodiment, with respect to each of the plurality of vertical pattern electrodes, the touch sensing circuit 140 may determine the data of the plurality of vertical sub-patterns based on the sensing values V1, V2, V3, and V4 sensed by each of the vertical pattern electrodes and sensing values sensed by at least one horizontal pattern electrode adjacent to each of the plurality of vertical sub-patterns corresponding to each of the vertical pattern electrodes. The method for determining the data of the vertical sub-patterns may be represented in Mathematical expression 1 below, but is not limited thereto.

$$Vn\text{-}m = Vn \times (Hm + H(m+1)) / (H1 + H2 + H3 + H4) \quad \text{[Mathematical expression 1]}$$

According to an embodiment, referring to Mathematical expression 1, the (1-1)-th vertical sub-pattern data V1-1 of the first vertical pattern data V1 may be determined based on the first vertical pattern data V1 and the sensing values (i.e., H1 and H2) sensed by the horizontal pattern electrodes (i.e., first horizontal pattern electrode and second horizontal pattern electrode) adjacent to the (1-1)-th vertical sub-pattern. The (1-2)-th vertical sub-pattern data V1-2 of the first vertical pattern data V1 may be determined based on the first vertical pattern data V1 and the sensing values (i.e., H2 and H3) sensed by the horizontal pattern electrodes (i.e., second horizontal pattern electrode and third horizontal pattern electrode) adjacent to the (1-2)-th vertical sub-pattern. The (1-3)-th vertical sub-pattern data V1-3 of the first vertical pattern data V1 may be determined based on the first vertical pattern data V1 and the sensing values (i.e., H3 and H4) sensed by the horizontal pattern electrodes (i.e., third horizontal pattern electrode and fourth horizontal pattern electrode) adjacent to the (1-3)-th vertical sub-pattern. The (1-4)-th vertical sub-pattern data V1-4 of the first vertical pattern data V1 may be determined based on the first vertical pattern data V1 and the sensing values (i.e., H4 and H1 of adjacent array) sensed by the horizontal pattern electrodes (i.e., fourth horizontal pattern electrode and first horizontal pattern electrode of the adjacent array) adjacent to the (1-4)-th vertical sub-pattern. Even the respective vertical sub-pattern data of the second vertical pattern data V2, the third vertical pattern data V3, and the fourth vertical pattern data V4 may be determined by the same or similar method as above.

According to an embodiment, with respect to each of the plurality of horizontal pattern electrodes, the touch sensing circuit 140 may determine the data of the plurality of horizontal sub-patterns based on the sensing values H1, H2, H3, and H4 sensed by each of the horizontal pattern electrodes and at least one vertical sub-pattern data adjacent to each of the plurality of horizontal sub-patterns corresponding to each of the horizontal pattern electrodes. The method for determining the data of the horizontal sub-patterns may be represented in Mathematical expression 2 below, but is not limited thereto.

$$Hn\text{-}m = Hn \times \frac{Vm\text{-}(n-1) + Vm\text{-}n}{(Vsum) \times 1.5} \quad \text{[Mathematical expression 2]}$$

In Mathematical expression 2, Vsum may be defined as in Mathematical expression 3 below.

$$Vsum = V1\text{-}n + V2\text{-}n + V3\text{-}n + V4\text{-}n + V1\text{-}(n-1) + V2\text{-}(n-1) + V3\text{-}(n-1) + V4\text{-}(n-1) \quad \text{[Mathematical expression 3]}$$

According to an embodiment, referring to Mathematical expression 2 and the mathematical expression 3, the (2-1)-th horizontal sub-pattern data H2-1 of the second horizontal pattern data H2 may be determined based on the second horizontal pattern data H2 and the vertical sub-pattern data (i.e., the (1-1)-th vertical sub-pattern data V1-1 and the (1-2)-th vertical sub-pattern data V1-2) adjacent to the (2-1)-th horizontal sub-pattern. The (2-2)-th horizontal sub-pattern data H2-2 of the second horizontal pattern data H2 may be determined based on the second horizontal pattern data H2 and the vertical sub-pattern data (i.e., the (2-1)-th vertical sub-pattern data V2-1 and the (2-2)-th vertical sub-pattern data V2-2) adjacent to the (2-2)-th horizontal sub-pattern. The (2-3)-th horizontal sub-pattern data H2-3 of the second horizontal pattern data H2 may be determined based on the second horizontal pattern data H2 and the vertical sub-pattern data (i.e., the (3-1)-th vertical sub-pattern data V3-1 and the (3-2)-th vertical sub-pattern data V3-2) adjacent to the (2-3)-th horizontal sub-pattern. The (2-4)-th horizontal sub-pattern data H2-4 of the second horizontal pattern data H2 may be determined based on the second horizontal pattern data H2 and the vertical sub-pattern data (i.e., the (4-1)-th vertical sub-pattern data V4-1 and the (4-2)-th vertical sub-pattern data V4-2) adjacent to the (2-4)-th horizontal sub-pattern. Even the respective horizontal sub-pattern data of the first horizontal pattern data H1, the third horizontal pattern data H3, and the fourth horizontal pattern data H4 may be determined by the same or similar method as above.

Hereinafter, referring to FIGS. 9, 10A and 10B, an embodiment of converting data by the above-described method will be described.

Figure 9:
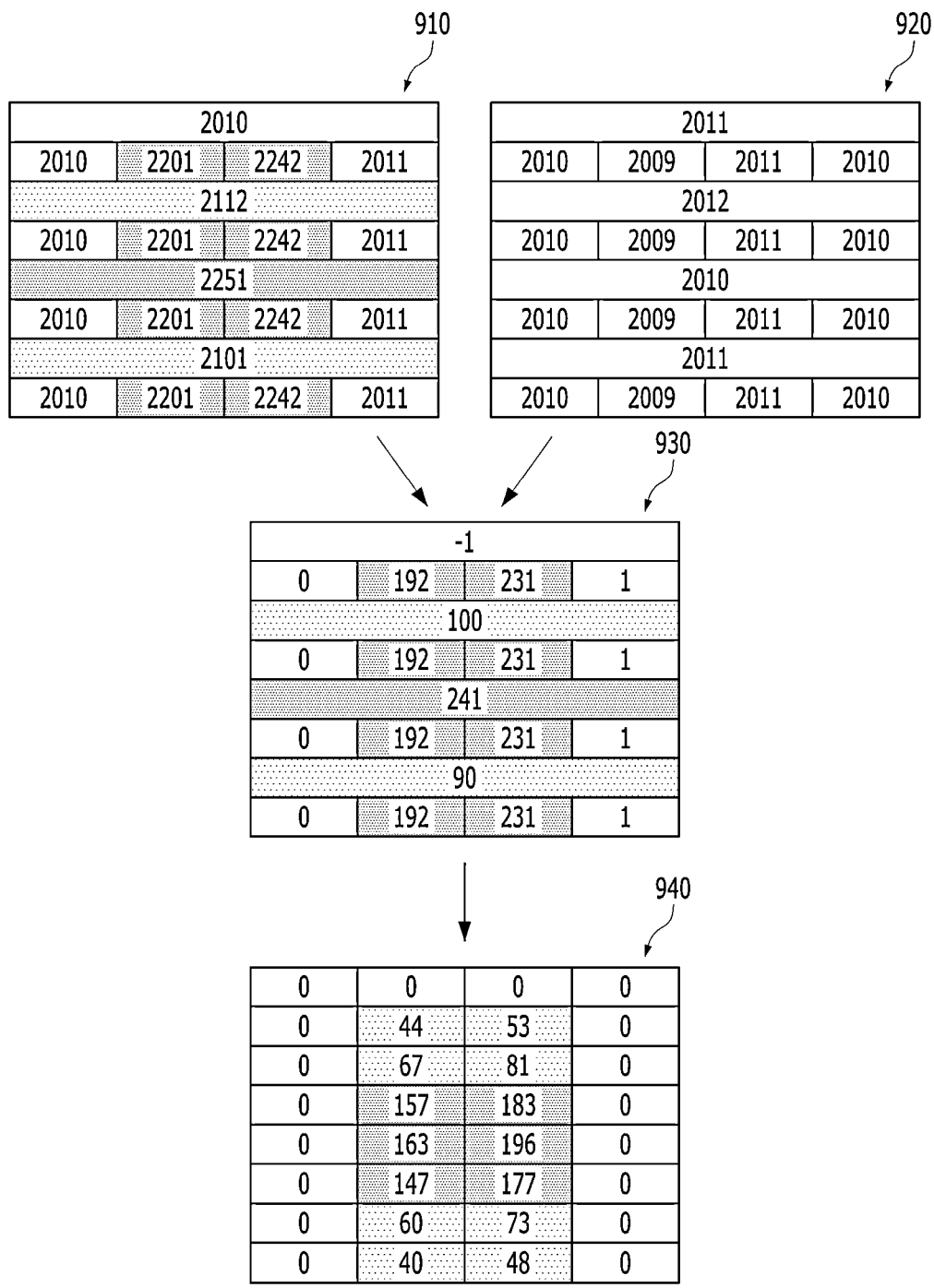
FIG. 9 is a diagram explaining a data conversion process between touch patterns according to an embodiment.

FIG. 9 is a diagram explaining a data conversion process between touch patterns according to an embodiment. Referring to FIG. 9, data 910 (e.g., row data) sensed through a unit array composed of four vertical pattern electrodes and four horizontal pattern electrodes may be computed with base data 920. For example, the base data 920 may correspond to a base sensing value corresponding to the base capacitance Ce described above with reference to FIG. 4. In FIG. 9, the sensed data 910 is identified so that data V1 sensed by the first vertical pattern electrode is 2010, data V2 sensed by the second vertical pattern electrode is 2201, data V3 sensed by the third vertical pattern electrode is 2242, and data V4 sensed by the fourth vertical pattern electrode is 2011. In FIG. 9, the base data 920 is identified so that base data for the first vertical pattern electrode is 2010, base data for the second vertical pattern electrode is 2009, base data for the third vertical pattern electrode is 2011, and base data for the fourth vertical pattern electrode is 2010.

According to an embodiment, delta data 930 may be calculated by computing a difference between the sensed data 910 and the base data 920. For example, in FIG. 9, the delta data 930 is identified so that delta data for the first vertical pattern electrode is 0, delta data for the second vertical pattern electrode is 192, delta data for the third vertical pattern electrode is 231, and delta data for the fourth vertical pattern electrode is 1.

According to an embodiment, the delta data 930 may be converted into data 940 corresponding to the first touch pattern (e.g., normal touch pattern) by the data conversion described above with reference to FIG. 8. An embodiment of converting into the data 940 corresponding to the first touch pattern according to FIG. 8 described above will be described with reference to FIGS. 10A and 10B.

Figure 10A:
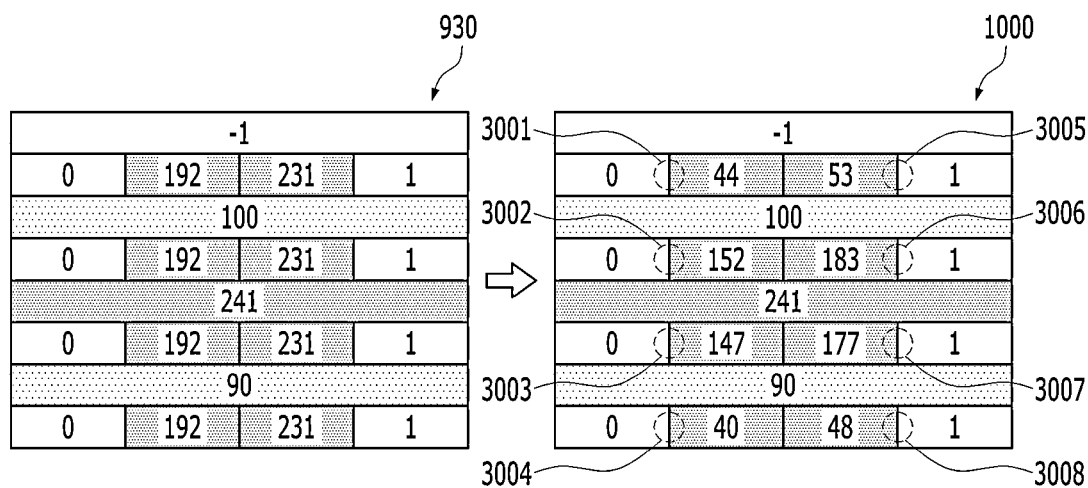
FIGS. 10A and 10B are diagrams explaining a data conversion process between touch patterns according to an embodiment.
Figure 10B:
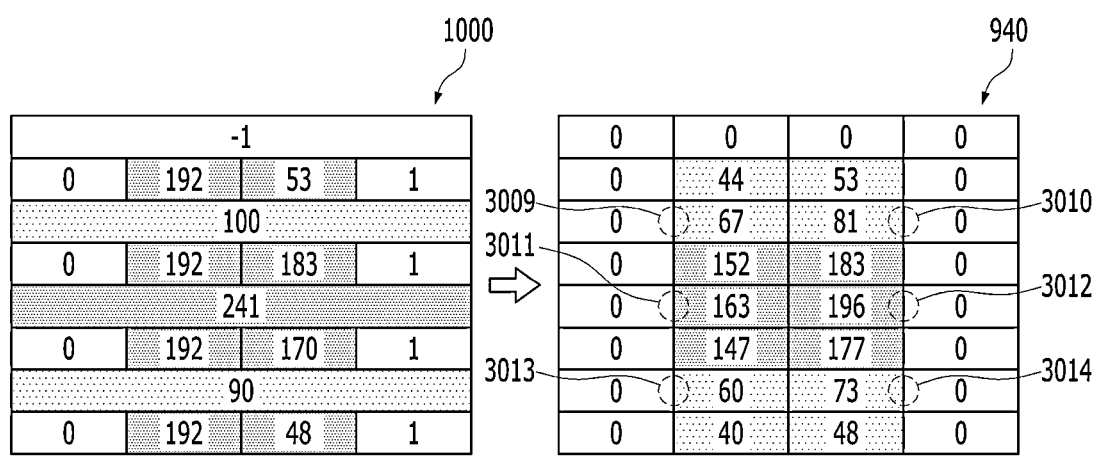

FIGS. 10A and 10B are diagrams explaining a data conversion process between touch patterns according to an embodiment. Referring to FIG. 10A, by applying the above-described mathematical expression 1, data 1000 of the plurality of vertical sub-patterns corresponding to each of the vertical pattern electrodes may be calculated from the delta data 930 illustrated on the left side. For example, the data 1000 of the plurality of vertical sub-patterns for each of the vertical pattern electrodes may be calculated according to the mathematical expression 1 as follows.

$$V2\text{-}1: 192*(-1+100)/(-1+100+241+90)=44 \quad\quad 1.$$

$$V2\text{-}2: 192*(100+241)/(-1+100+241+90)=152 \quad\quad 2.$$

$$V2\text{-}3: 192*(241+90)/(-1+100+241+90)=147 \quad\quad 3.$$

$$V2\text{-}4: 192*(90+0)/(-1+100+241+90)=40 \quad\quad 4.$$

$$V3\text{-}1: 231*(-1+100)/(-1+100+241+90)=53 \quad\quad 5.$$

$$V3\text{-}2: 231*(100+241)/(-1+100+241+90)=183 \quad\quad 6.$$

$$V3\text{-}3: 231*(241+90)/(-1+100+241+90)=177 \quad\quad 7.$$

$$V3\text{-}4: 231*(90+0)/(-1+100+241+90)=48 \quad\quad 8.$$

Referring to FIG. 10B, data 940 of the horizontal sub-patterns may be calculated using the data 1000 of the vertical sub-patterns calculated in FIG. 10A.

For example, by applying the above-described mathematical expression 2 and mathematical expression 3, the data 940 of the plurality of horizontal sub-patterns corresponding to each of the horizontal pattern electrodes may be calculated from the data 1000 of the vertical sub-patterns illustrated on the left side. For example, the data 940 of the plurality of horizontal sub-patterns for each of the horizontal pattern electrodes may be calculated according to the mathematical expression 2 and mathematical expression 3 as follows.

$$H2\text{-}2: \quad 100*(44+152)/(0+44+53+0+0+152+183+0)=45*1.5=67 \quad\quad 9.$$

$$H3\text{-}2: \quad 100*(53+183)/(0+44+53+0+0+152+183+0)=54*1.5=81 \quad\quad 10.$$

$$H4\text{-}2: \quad 241*(152+147)/(0+152+183+0+0+147+177+0)=109*1.5=163 \quad\quad 11.$$

$$H2\text{-}3: \quad 241*(183+177)/(0+152+183+0+0+147+177+0)=131*1.5=196 \quad\quad 12.$$

$$H3\text{-}3: \quad 90*(147+40)/(0+147+177+0+0+40+48+0)=40*1.5=60 \quad\quad 13.$$

$$H4\text{-}3: \quad 90*(177+48)/(0+147+177+0+0+40+48+0)=49*1.5=73 \quad\quad 14.$$

According to FIGS. 10A and 10B described above, if the data of the vertical sub-patterns and the data of the horizontal sub-patterns are calculated, the touch sensing circuit 140 may identify the touch coordinates based on the calculated data. For example, as described above with reference to FIG. 5, the touch sensing circuit 140 may calculate the touch coordinates by inputting various sensing values being identified along a predetermined line to a specific model or algorithm. That is, since the data of the vertical sub-patterns and the data of the horizontal sub-patterns calculated according to FIGS. 10A and 10B are in the form of a matrix described above with reference to FIG. 5, a touch coordinate calculation algorithm applied to the existing matrix form can be applied in the same or similar manner.

Figure 11:
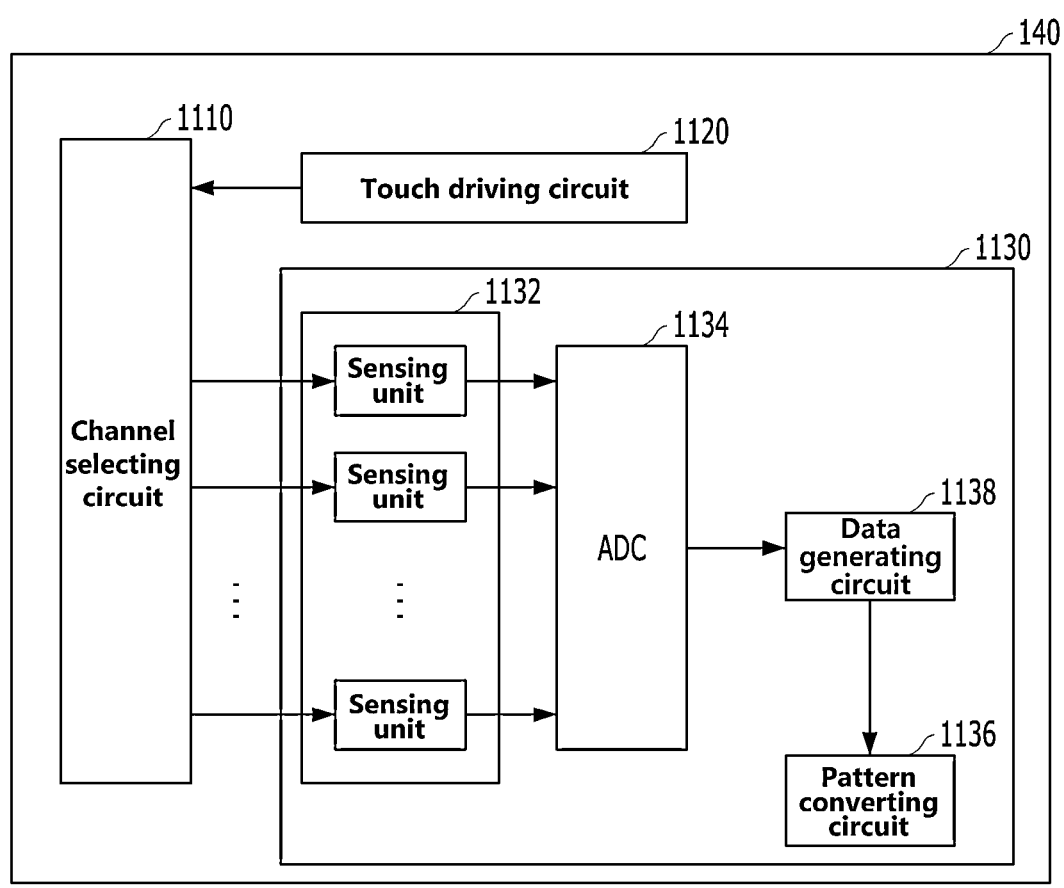
FIG. 11 is a configuration diagram of a touch sensing circuit according to an embodiment.

FIG. 11 is a configuration diagram of a touch sensing circuit according to an embodiment. Referring to FIG. 11, a touch sensing circuit 140 includes a channel selecting circuit 1110, a touch driving circuit 1120, and a data processing circuit 1130. The channel selecting circuit 1110 is connected to a plurality of touch electrodes in a one-to-one manner through a plurality of touch lines. The channel selecting circuit 1110 supplies an uplink signal being supplied from the touch driving circuit 1120 for a first touch sensing period to the touch electrodes, and supplies a touch driving signal being supplied from the touch driving circuit 1120 for a third touch sensing period to the touch electrodes.

Further, in order to sense capacitance being generated by an active pen touch or finger touch, the channel selecting circuit 1110 connects the touch lines to the data processing circuit 1130 for a second touch sensing period and the third touch sensing period. For this, the channel selecting circuit 1110 may include a plurality of multiplexers (not illustrated) being switched according to a touch synchronizing signal and a channel selection signal, and selectively connecting the plurality of touch lines to the data processing circuit 1130.

Meanwhile, the channel selecting circuit 1110 may supply a common voltage to the plurality of touch electrodes through the plurality of touch lines for a display period DP1 to DPn of the touch synchronizing signal. The touch driving circuit 1120 generates the uplink signal or the touch driving signal, and supplies the generated uplink signal or touch driving signal to the touch electrodes through the touch lines connected to the channel selecting circuit 1110. Specifically, the touch driving circuit 1120 generates the uplink signal for the first touch sensing period of one frame period and supplies the generated uplink signal to the touch electrodes through the touch lines, and generates the touch driving signal for a plurality of third touch sensing period of one frame period and supplies the generated touch driving signal to the touch electrodes through the touch lines. In this case, the uplink signal may include panel information of the panel 120, a protocol version, or a synchronizing signal.

In an embodiment, the touch driving circuit 1120 may generate the uplink signal or the touch driving signal by using a driving signal DS having a plurality of driving pulses swinging between a high voltage and a low voltage based on a reference common voltage. Meanwhile, the touch driving circuit 1120 may supply the common voltage to the plurality of touch electrodes through the plurality of touch lines for the display periods of the touch synchronizing signal. In FIG. 11, it is described that the touch driving circuit 1120 directly inputs the uplink signal or the touch driving signal to the channel selecting circuit 1110, but in a modified embodiment, the touch driving circuit 1120 may input the uplink signal or the touch driving signal to the channel selecting circuit 1110 through the data processing circuit 1130.

Further, the data processing circuit 1130 generates second sensing data by sensing a finger touch for the third touch sensing period and determines coordinates by the finger touch using the generated second sensing data.

The data processing circuit 1130 may perform all of the processes related with the data processing in the touch sensing circuit 140. All functions regarding the data processing in operations in the touch sensing circuit 140 in this specification may be performed by the data processing circuit 1130.

In order to implement the above-described function, the data processing circuit 1130 according to the present disclosure includes a plurality of sensing units 1132, an analog-digital converter (ADC) 1134, a pattern conversion circuit 1136, and a data generating circuit 1138 as illustrated in FIG. 11.

According to an embodiment, as illustrated in FIGS. 7 to 9, the data generating circuit 1138 may generate data 910 and 930 of the first touch pattern (e.g., SNS touch pattern). As described above with reference to FIGS. 8 to 10, the pattern conversion circuit 1136 may convert the data 910 of the first touch pattern into the data 940 of the second touch pattern.

The touch sensing circuit 140 may identify the touch coordinates or whether to touch based on the converted data 940 of the second touch pattern.

Figure 12:
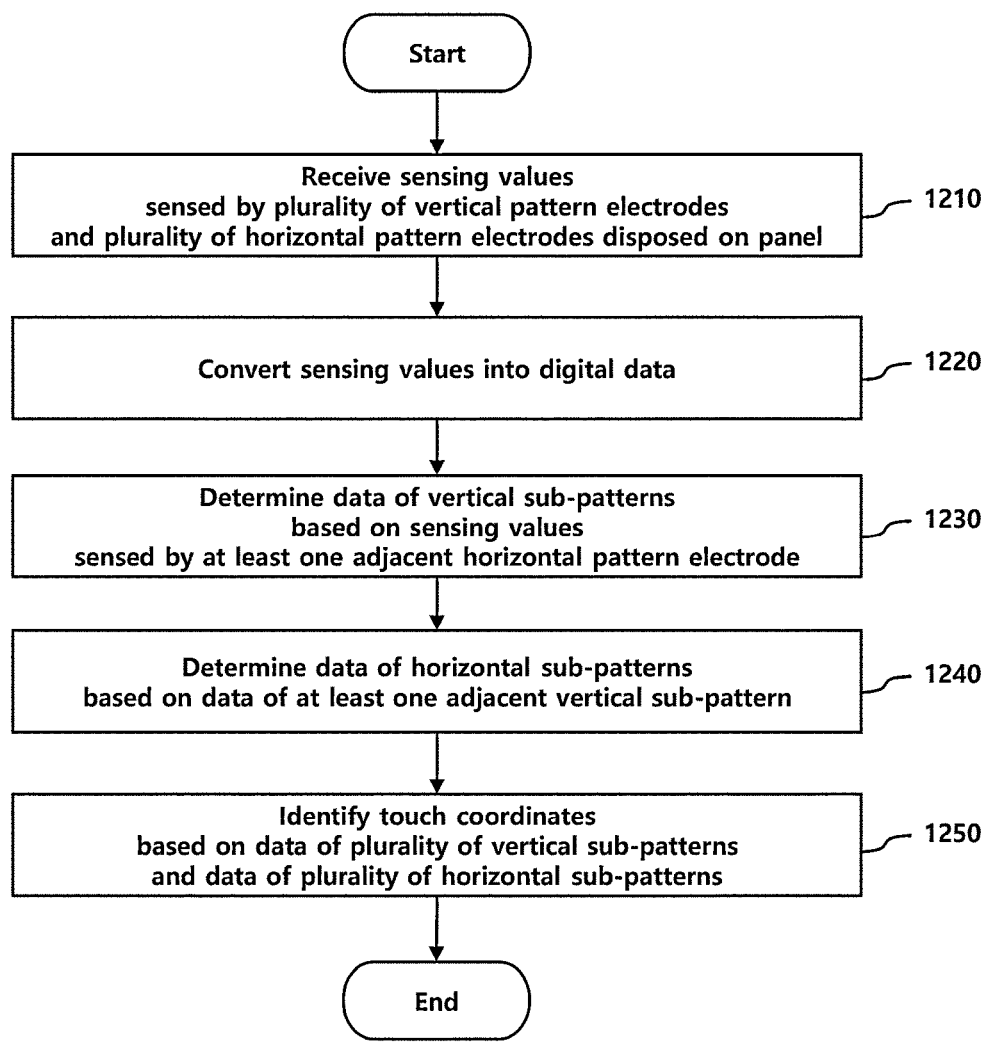
FIG. 12 is a flowchart explaining a touch sensing operation according to an embodiment.

FIG. 12 is a flowchart explaining a touch sensing operation according to an embodiment. Referring to FIG. 12, the touch sensing circuit 140, in step 1210, may receive sensing values sensed by the plurality of vertical pattern electrodes and the plurality of horizontal pattern electrodes disposed on the panel 120.

In step 1220, the touch sensing circuit 140 (e.g., ADC 1134) may convert the sensing values into digital data. According to an embodiment, the sensed data 910 (e.g., raw data) having been converted into the digital data may be computed with the base data 920.

In step 1230, the touch sensing circuit 140 may determine the data of the vertical sub-patterns based on the sensing values sensed by the vertical pattern electrode and the sensing value sensed by at least one horizontal pattern electrode adjacent to each of the vertical sub-patterns corresponding to the vertical pattern electrode.

In step 1240, the touch sensing circuit 140 may determine the data of the horizontal sub-patterns based on the sensing value sensed by the horizontal pattern electrode and the data of at least one vertical sub-pattern adjacent to each of the horizontal sub-patterns corresponding to the horizontal pattern electrode.

In step 1250, the touch sensing circuit 140 may identify the touch coordinates and whether to touch based on the data of the plurality of vertical sub-patterns and the data of the plurality of horizontal sub-patterns.

As described above, according to the present disclosure, even when patterns of touch electrodes are changed, it is possible to determine accurate coordinates as the existing pattern of touch electrodes does through the data converting process. In addition, according to the present disclosure, sensing data of a pattern in a form of a matrix can be obtained from sensing values sensed in a plurality of vertical pattern electrodes and a plurality of horizontal pattern electrodes. Further, according to the present disclosure, although the relatively small number of touch electrodes are disposed in a region having the same area as the prior arts, a greater amount of data can be generated and this allows determination of precise and accurate touch coordinates.

In addition, in the panel according to the present disclosure, the number of channels for driving touch electrodes may be reduced to ½. Accordingly, the size of an integrated circuit for driving touch electrodes may be reduced and this may lead to the reduction of costs for manufacturing the integrated circuit.

In the above, the description relates to an example in which an external object touching a panel is a finger, so called a finger touch type for the sake of convenience of description. However, the present disclosure is not limited thereto. The present disclosure may also be applied to an active pen (stylus) touch type.

What is claimed is:

1. A touch sensing apparatus comprising:
a touch driving circuit to supply driving signals to a first vertical pattern electrode comprising a plurality of vertical sub-pattern electrodes, a first horizontal pattern electrode, and a second horizontal pattern electrode adjacent to one vertical sub-pattern electrode included in the plurality of vertical sub-pattern electrodes; and
a data processing circuit to generate data of a first touch pattern based on first vertical sensing values sensed by the plurality of vertical sub-pattern electrodes of the first vertical pattern electrode, a first horizontal sensing value sensed by the first horizontal pattern electrode, and a second horizontal sensing value sensed by the second horizontal pattern electrode, wherein the data processing circuit is further configured to:
convert the data of the first touch pattern into data of a second touch pattern, the converted data of the second touch pattern being in a matrix shape, and
identify a touch coordinate and/or detect a touch based on the converted data of the second touch pattern.

2. The touch sensing apparatus according to claim 1, wherein
the touch driving circuit is configured to supply the driving signals to a plurality of vertical sub-pattern electrodes of a second vertical pattern electrode adjacent to the first horizontal pattern electrode, and
the data of the first touch pattern is generated further based on second vertical sensing values sensed by the plurality of vertical sub-pattern electrodes of the second vertical pattern electrode.

3. The touch sensing apparatus according to claim 1, wherein
the plurality of vertical sub-pattern electrodes are separately disposed on a panel, and
the plurality of vertical sub-pattern electrodes are connected by one touch driving line.

4. The touch sensing apparatus according to claim 1, wherein
the data of the second touch pattern comprises first data and second data,
the first data indicates whether a touch occurred at a location corresponding to one of the plurality of vertical sub-pattern electrodes,
the second touch data indicates whether a touch occurred at a location corresponding to a part of the horizontal pattern electrode,
the touch driving circuit is configured to supply a driving signal to each of (i) a second vertical pattern electrode comprising a plurality of vertical sub-pattern electrodes, (ii) a third vertical pattern electrode comprising a plurality of vertical sub-pattern electrodes, and a fourth vertical pattern electrode comprising a plurality of vertical sub-pattern electrodes, and
the second touch data is determined based on the first horizontal sensing value and a sum of (i) a vertical sensing value sensed by a vertical sub-pattern electrode included in the second vertical pattern electrode, (ii) a vertical sensing value sensed by a vertical sub-pattern electrode included in the third vertical pattern electrode, and (iii) a vertical sensing value sensed by a vertical sub-pattern electrode included in the fourth vertical pattern electrode.

5. The touch sensing apparatus according to claim 1, wherein
data corresponding to N*M*2 sub-pattern electrodes are generated from sensing values sensed by N vertical pattern electrodes and M horizontal pattern electrodes, and
each of N and M is a positive integer.

6. The touch sensing apparatus according to claim 5, wherein the sub-pattern electrodes form a matrix composed of M*2 rows and N columns.

7. A touch sensing apparatus comprising:
a touch driving circuit to supply driving signals to a plurality of vertical pattern electrodes and a plurality of horizontal pattern electrodes; and
a data processing circuit to generate data of a first touch pattern based on a plurality of vertical sensing values sensed by the plurality of vertical pattern electrodes, and a plurality of horizontal sensing values sensed by the plurality of horizontal pattern electrodes, wherein the data processing circuit is further configured to:
convert the data of the first touch pattern into data of a second touch pattern, the converted data of the second touch pattern being in a matrix shape, and
identify a touch coordinate and/or detect a touch based on the converted data of the second touch pattern, and
the data of the second touch pattern is generated by:
determining data corresponding to each of a plurality of vertical sub-pattern electrodes, with respect to each of the plurality of vertical pattern electrodes, based on a sensing value sensed by each of the vertical pattern electrodes and a sensing value sensed by at least one of the horizontal pattern electrodes adjacent to each of the plurality of vertical sub-pattern electrodes,
and
identifying the touch coordinate based on the determined data corresponding to each of the plurality of vertical sub-pattern electrodes and the data corresponding to each of the plurality of horizontal pattern electrodes.

8. The touch sensing apparatus according to claim 7, wherein
the data processing circuit is configured to:
generate the data of the first touch pattern based on a difference between base data and the sensing values sensed by the plurality of vertical pattern electrodes and sensed by the plurality of horizontal pattern electrodes, and
identify the touch coordinate based on the difference.

9. The touch sensing apparatus according to claim 7, wherein the data processing circuit is configured, in order to obtain the data of the second touch pattern, to determine the data corresponding to each of the plurality of vertical sub-pattern electrodes further based on the sensing values sensed by the plurality of horizontal pattern electrodes.

10. The touch sensing apparatus according to claim 7, wherein the data processing circuit is configured, in order to obtain the data of the second touch pattern, to determine the data corresponding to each of the plurality of horizontal sub-pattern electrodes further based on the data corresponding to the plurality of vertical sub-pattern electrodes adjacent to the horizontal pattern electrode corresponding to each of the horizontal sub-pattern electrodes.

11. The touch sensing apparatus according to claim 7, wherein
data corresponding to N*M*2 sub-pattern electrodes are generated from sensing values sensed by N vertical pattern electrodes and M horizontal pattern electrodes, and
each of N and M is a positive integer.

12. The touch sensing apparatus according to claim 11, wherein the sub-patterns form a matrix composed of M*2 rows and N columns.

13. The touch sensing apparatus according to claim 7, wherein each of the vertical pattern electrodes is disposed on a panel by being divided into the plurality of vertical sub-pattern electrodes.

14. The touch sensing apparatus according to claim 13, wherein the plurality of vertical sub-pattern electrodes are connected by one touch driving line.

15. The touch sensing apparatus according to claim 7, wherein the data corresponding to each of the plurality of vertical sub-pattern electrodes is determined based on a sensing value sensed by a horizontal pattern electrode adjacent to an upper part of each of the vertical sub-pattern electrodes and a sensing value sensed by a horizontal pattern electrode adjacent to a lower part of each of the vertical sub-pattern electrodes.

16. The touch sensing apparatus according to claim 7, wherein the data corresponding to each of the plurality of horizontal sub-pattern electrodes is determined based on data corresponding to a vertical sub-pattern electrode adjacent to an upper part of each of the horizontal sub-pattern electrodes and data corresponding to a vertical sub-pattern electrode adjacent to a lower part of each of the horizontal sub-pattern electrodes.

17. A touch sensing apparatus comprising:
a touch driving circuit to supply driving signals to a plurality of first-direction electrodes and a plurality of second-direction electrodes, which are disposed to be perpendicular to the first-direction electrodes; and
a data processing circuit to generate data of a first touch pattern based on a plurality of first-direction sensing values sensed by the plurality of first-direction electrodes and a plurality of second-direction sensing values sensed by the plurality of second-direction electrodes, wherein the data processing circuit is further configured to:
convert the data of the first touch pattern into data of a second touch pattern in a matrix shape,
identify a touch coordinate and/or detect a touch based on the data of the second touch pattern,
in order to obtain the converted data of the second touch pattern, determines data corresponding to a plurality of first-direction sub-pattern electrodes, corresponding to each of the plurality of first-direction electrodes, based on the sensing values sensed by the plurality of second-direction electrodes, and
determine data corresponding to a plurality of second-direction sub-pattern electrodes, corresponding to each of the plurality of second-direction electrodes, based on the determined data corresponding to the plurality of first-direction sub-pattern electrodes corresponding to the each first-direction electrode.

18. The touch sensing apparatus according to claim 17, wherein
data of each of the plurality of first-direction sub-pattern electrodes is determined based on a sensing value sensed by a second-direction electrode adjacent to each first-direction sub-pattern electrode and
data of each of the plurality of second-direction sub-pattern electrodes is determined based on data of a first-direction sub-pattern electrode adjacent to each second-direction sub-pattern electrode.

19. The touch sensing apparatus according to claim 17, wherein the plurality of first direction sub-pattern electrodes are separately disposed on a panel.

20. The touch sensing apparatus according to claim 19, wherein the plurality of first direction sub-pattern electrodes are connected by one touch driving line.

* * * * *